May 30, 1967 F. T. COX ETAL 3,322,241
BRAKE SYSTEM
Original Filed June 6, 1963 2 Sheets-Sheet 2
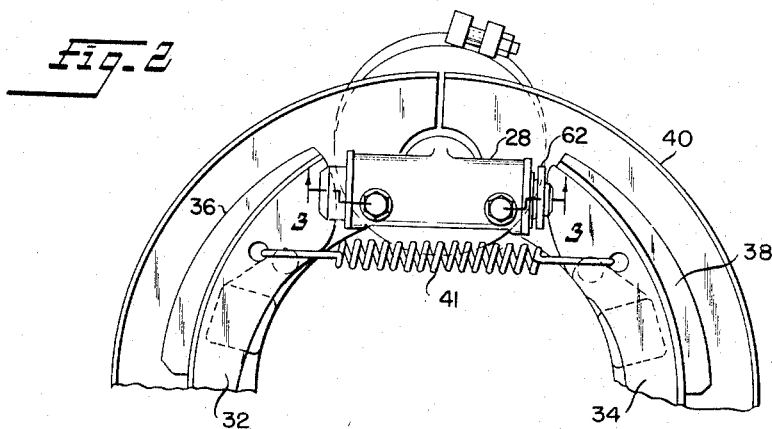
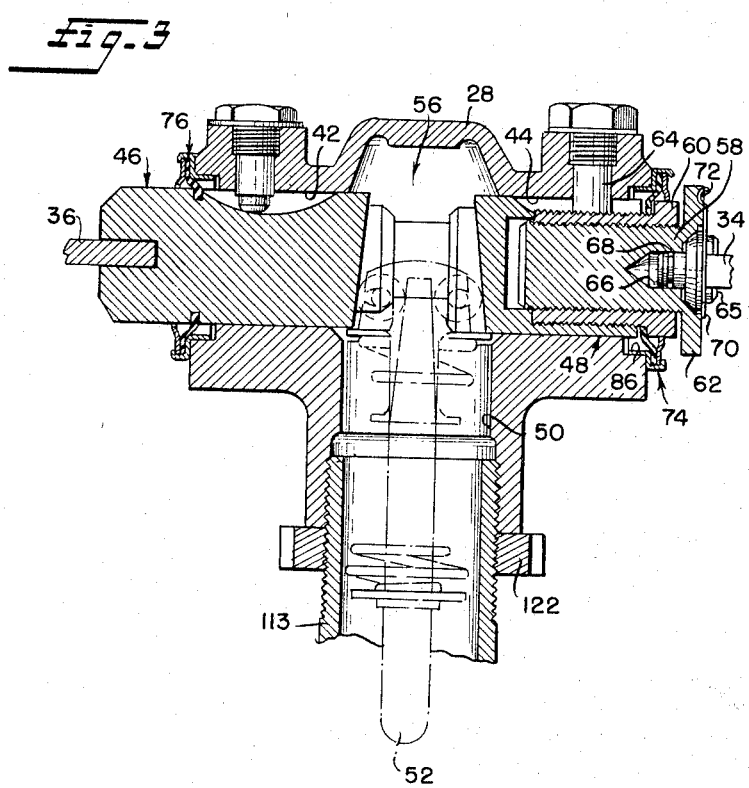
INVENTORS
Frank T. Cox
William J. Williams
BY Strauch, Nolan, Neale, Nies & Bronaugh
ATTORNEYS

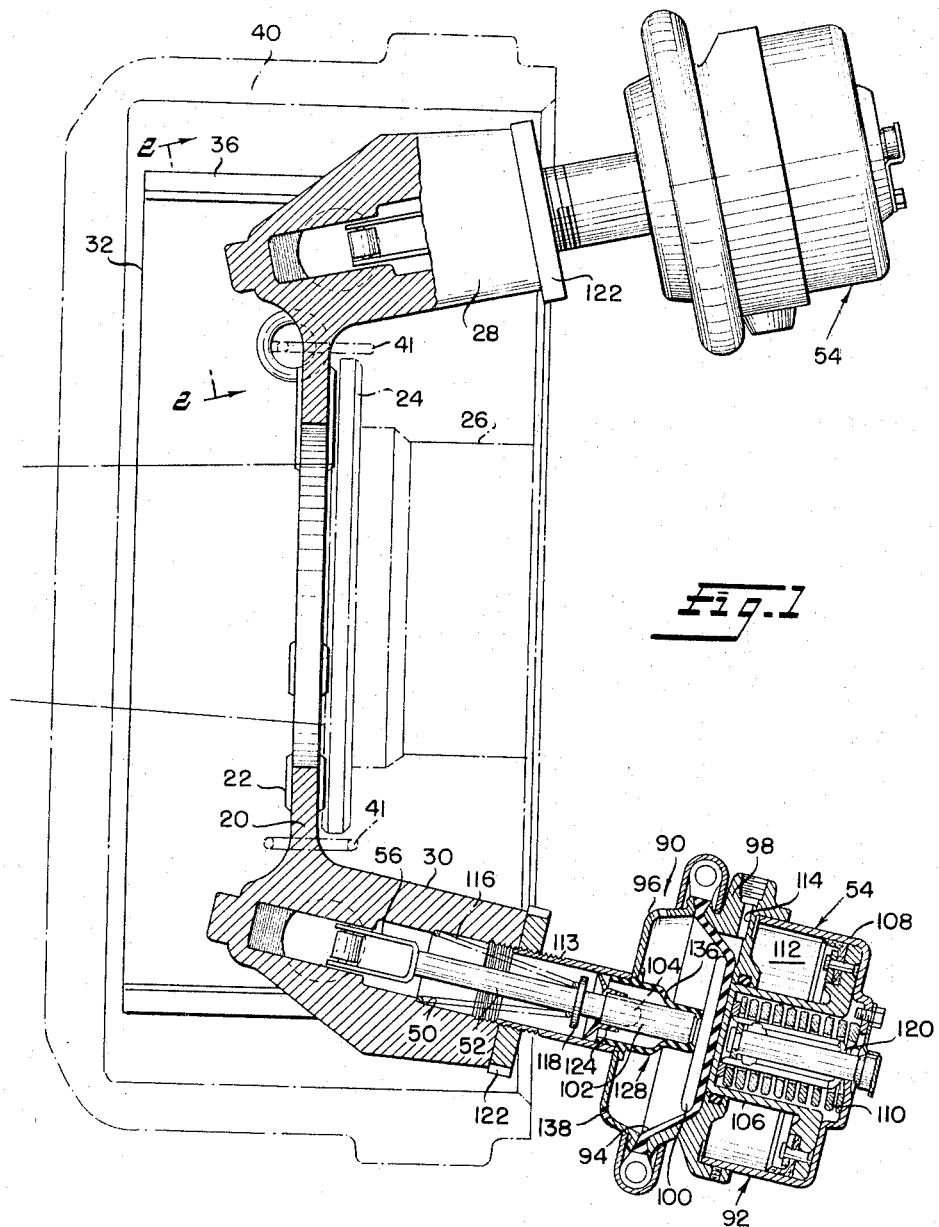

United States Patent Office 3,322,241
Patented May 30, 1967

3,322,241
BRAKE SYSTEM
Frank T. Cox and William J. Williams, both of Ashtabula, Ohio, assignors to Rockwell-Standard Corporation, Pittsburgh, Pa., a corporation of Delaware
Continuation of application Ser. No. 286,038, June 6, 1963, now Patent No. 3,269,492. This application Jan. 24, 1966, Ser. No. 522,478
1 Claim. (Cl. 188—170)

This application is a continuation of application Ser. No. 286,038, filed June 6, 1963, for Vehicle Brake Systems, now Patent 3,269,492.

It has long been desired in the automotive field, particularly in the truck field, to provide brake systems which are trouble free, which do not require lubrication nor adjustment throughout the life of the brake linings and which provide safe reliable operation even after excessive lining wear or failure of the normal brake operator.

The present invention provides brake systems of the general type disclosed in Patent 3,037,584, owned by applicant's assignee. In this type of heavy duty brake system the brake actuating mechanism is supported on a spider which may be bolted or welded to the usual axle housing flange and extending generally radially within the brake drum. The spider supports both the wedge actuated brake mechanism and the pneumatic or hydraulic operator for the wedge type mechanism.

It is an important object of the present invention to provide improved brake mechanisms of the general type shown in Patent 3,037,584 which offer increased reliability, reduced maintenance requirements and which also provide for automatic application of the brakes in the event of failure of the normal hydraulic or pneumatic operating system despite excessive brake lining wear.

Additional objects and advantages will become apparent as the description proceeds in connection with the accompanying drawings in which:

FIGURE 1 is a side view partly in section and partly in elevation illustrating a brake system incorporating the present invention;

FIGURE 2 is a half plan view illustrating the connection of an actuating mechanism to the brake shoes; and FIGURE 3 is an enlarged section of the portion of the actuator mechanism connected to the brake shoes.

Referring now more particularly to the drawings, the brake mechanism of the present invention is supported on a spider 20 secured for example by rivets 22 to the usual flange 24 formed integrally with the axle housing 26. As explained in detail below all of the brake actuating mechanisms are supported on housings 28 and 30 formed integrally with the spider 20. The brake includes a pair of shoes 32 and 34 suitably mounted on the spider 20 and provided with the usual linings 36 and 38 for selective engagement with the interior of the brake drum 40. The brake shoes are held in retracted position in the manner shown in the aforesaid U.S. Patent 3,037,584.

As best shown in FIGURE 3, the housing 28, which is identical to the housing 30, is provided with aligned cylindrical bores 42 and 44 which slidably support brake actuating plunger assemblies 46 and 48, respectively, and a side opening 50 through which a brake actuating plunger 52 extends.

The inner end of the plunger 52, which is reciprocated by the actuator mechanisms 54 described in detail below, is connected to a wedge roller mechanism, indicated generally at 56, which engages the inner ends of the plunger assemblies 46 and 48.

The plunger assembly 48 contains a mechanism for initially adjusting the brakes and for automatically adjusting the brakes in operation. This mechanism comprises inner and outer nuts 58 and 60 which, when relatively rotated, change the effective length of the plunger assembly. For the initial adjustment the inner nut member 58 is rotated by means of a star wheel 62 and for automatic adjustment a ratchet mechanism 64 is provided which operates in the manner explained in detail in U.S. Patent 3,068,964, owned by applicant's assignee. A retainer 65, which engages the brake shoes 34 is frictionally held in a bore 66 in the inner nut member 58 by an O-ring 68 and is releasably locked against rotation with respect to the nut member 58 by a spring lock member 70 having a detent portion 72 receivable in one of a series of peripheral indentations in the star wheel 62.

The outer ends of the plungers 46 and 48 are protected by suitable seating assemblies indicated generally at 74 and 76, respectively.

The air brake actuators 54, which are of identical construction, each comprise a service chamber section 90 and a spring actuated emergency section 92 which are of essentially unitary construction. Except as noted below the actuators 54 are of the same construction as that disclosed and claimed in U.S. Patent 3,136,227, owned by applicant's assignee. Accordingly, they will be disclosed here only to the extent necessary to an understanding of the present invention.

The service chamber section 90 of the brake includes a flexible diaphragm 94 peripherally clamped between housing sections 96 and 98 and having a central portion abutting a circular pad 100 formed integrally with or otherwise secured to the end of the pushrod 102, the end of which is recessed as at 104 to receive the rounded outer end of the plunger 52. The diaphragm 94 is normally urged to the position shown in FIGURE 1 by the action of the brake springs in which position the central portion of the diaphragm rests against the inner end of an emergency piston 106 slidably received in a cylindrical cup 108 threaded into or otherwise secured to the housing section 98. A strong spring 110 is normally compressed between the end of the housing member 108 and the inner surface of the piston 106. The piston 106 is normally held in its fully retracted position by system pressure supplied through an inlet, not shown, to the space 112 at the forward side of the piston. The brake is normally applied by applying system pressure through an inlet 114. This moves the diaphragm 94 and the plungers 102 and 52 to the left, urging the wedge mechanism 56 between the plungers 46 and 48 to spread the latter apart to apply the brakes. In normal operation the emergency piston 106 remains in its fully retracted position.

When the brakes are released the springs 41 return the brake shoes to their inactive position and return the other components to the position shown in FIGURE 1. This action is aided by a spring 116 compressed between a portion of the housing 30 and a washer 118 carried by the pushrod 52.

Should the normal system pressure fall below a predetermined level for any reason, the spring 110 will advance the piston 106 to effect automatic application of the brakes.

The mechanism is installed with the plungers 46 and 48 in engagement with the respective brake shoes and closely adjacent their inner limit of travel. The plunger 52 is moved to a position to insure positive but light engagement between the wedge roller mechanism 56 and the inner ends of the plungers 46 and 48. Then the actuator mechanism 54 is installed by threading the tubular portion 113 into the threaded opening 50 provided in the housing 28 or 30. The components are adjusted properly when the previously described relationship of the wedge mechanism 56 and the plungers 46 and 48 is maintained and the outer end of the plunger 52 is firmly seated in the plunger 102 and the diaphragm 94 is in the retracted position as shown in FIGURE 1. During installation the piston 106 is held in retracted position by a retainer mechanism 120 described in detail in application Serial No. 52,711, now Patent No. 3,136,227. Assembly of the components is facilitated by a plastic guide 124 carried by the end of the stub shaft 102. The actuator 54 is then firmly locked in this position by a lock nut 122 threaded on the outer surface of the tubular portion 113 and tightly engaging the outer end of the housing 28 and 30. This adjustment of the system provides a convenient, quick means for assembling the brakes to assure their efficient subsequent operation without the need for manufacturing the brakes to particularly close tolerances and also permits a convenient way of aligning the hydraulic connections.

A rubber boot type seal structure 128 is provided to protect the actuator 54. One end of the seal 128, is cemented to the outer end of the tubular portion 113 of the actuator. At its opposite end the seal 128 is tightly secured to the stub shaft 102. In its relatively enlarged portion the seal is provided with a breather hole 136. A plurality of slightly larger breather holes 138 are provided in the chamber member 96.

Once the assembly has been installed and final adjustment has been made at the star wheel 62 the brakes may be operated by moving the diaphragm and associated mechanism through a stroke of predetermined relatively short length. Upon failure of the normal system air pressure for any reason the spring 110 will expand to move the normal brake operating mechanism through the same stroke to apply the brakes.

The automatic adjustment mechanism associated with the plunger assembly 48 assures that both the normal brake actuator and the emergency spring brake need move only through their design stroke to apply the brakes regardless of the lining wear. The emergency actuator will thus continue to be completely effective throughout the service life of the brake lining.

From the foregoing it will be apparent that the above stated objects and advantages of the invention have been attained by the provision of novel brake systems, the components of which cooperate to facilitate initial assembly and adjustment and which effectively maintain the adjustment during the life of a brake lining to assure the continued complete effectiveness of the emergency actuator.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaining and range of equivalency of the claim are therefore intended to be embraced therein.

What is claimed and desired to be secured by Letters Patent is:

A brake assembly comprising a pair of brake shoes having linings adapted to engage a surrounding brake drum, a pair of opposed plungers adapted, when urged apart, to urge said linings into contact with said drum, a wedge operator adapted, when advanced, to urge said plungers apart, a combined service and emergency actuator for said wedge operator comprising a housing member having a wall portion dividing said housing into a service chamber and an emergency chamber, a first pressure responsive member in said service chamber operatively connected to said wedge operator, a second pressure responsive member within said emergency chamber having a portion extending through a sealed opening in said wall portion of said housing member into abutting engagement with said first pressure responsive member, a fluid pressure connection for normally urging said second pressure responsive member away from said first pressure responsive member, a spring compressed between the side of said second pressure member and an end wall of said emergency chamber by fluid pressure within said emergency chamber at a predetermined value, said spring expanding to advance each of said pressure responsive members and said wedge operator to move said linings into engagement with said drum when said fluid pressure falls below said predetermined value, said pressure responsive members and said wedge operator moving through a stroke of predetermined length when said brake linings are unworn, and means for automatically adjusting the length of at least one of said plungers to compensate for wear in the linings of said brake shoes so that said brake shoes will be urged into firm pressure contact with said drum by advancement of said first and second pressure responsive members through said stroke of predetermined length under the influence of said spring despite wear of said linings.

References Cited

UNITED STATES PATENTS

| | | | |
|---|---|---|---|
| 3,037,584 | 5/1962 | Cox et al. | 188—78 |
| 3,068,964 | 12/1962 | Williams et al. | 188—79.5 |
| 3,136,227 | 5/1964 | Williams | 92—63 |

DUANE A. REGER, *Primary Examiner.*